June 19, 1928.

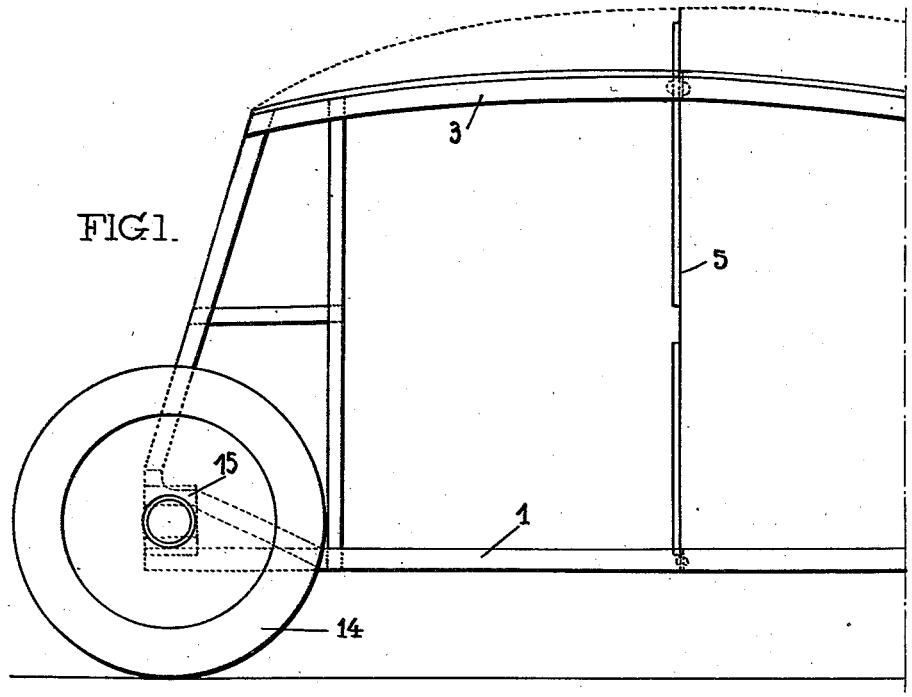
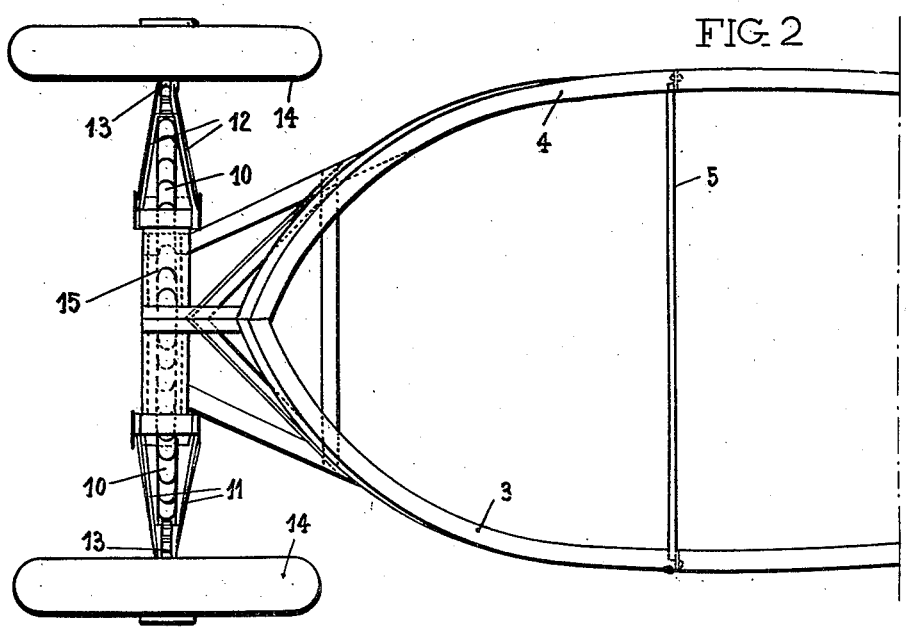

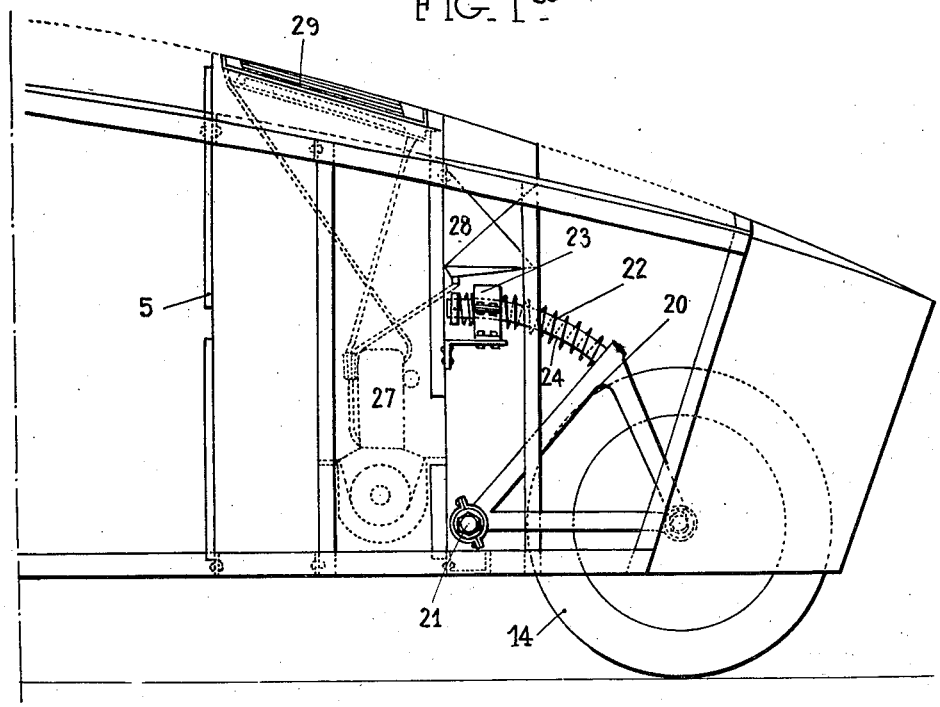
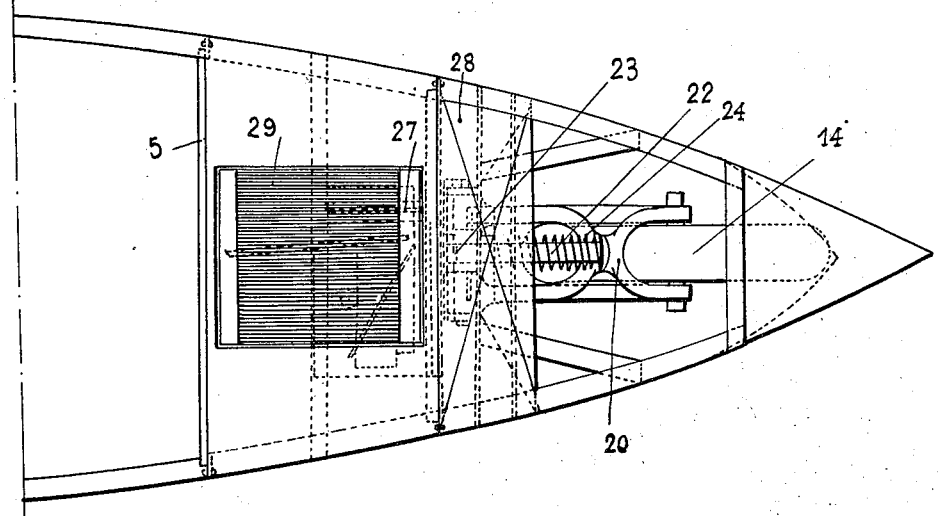

E. CLAVEAU 1,674,425

CONSTRUCTION OF CLOSED MOTOR VEHICLES

Filed Jan. 24, 1924          4 Sheets-Sheet 3

INVENTOR
Emile Claveau
BY Townsend & Decker
ATTORNEYS.

June 19, 1928.
E. CLAVEAU
1,674,425
CONSTRUCTION OF CLOSED MOTOR VEHICLES
Filed Jan. 24, 1924    4 Sheets-Sheet 4
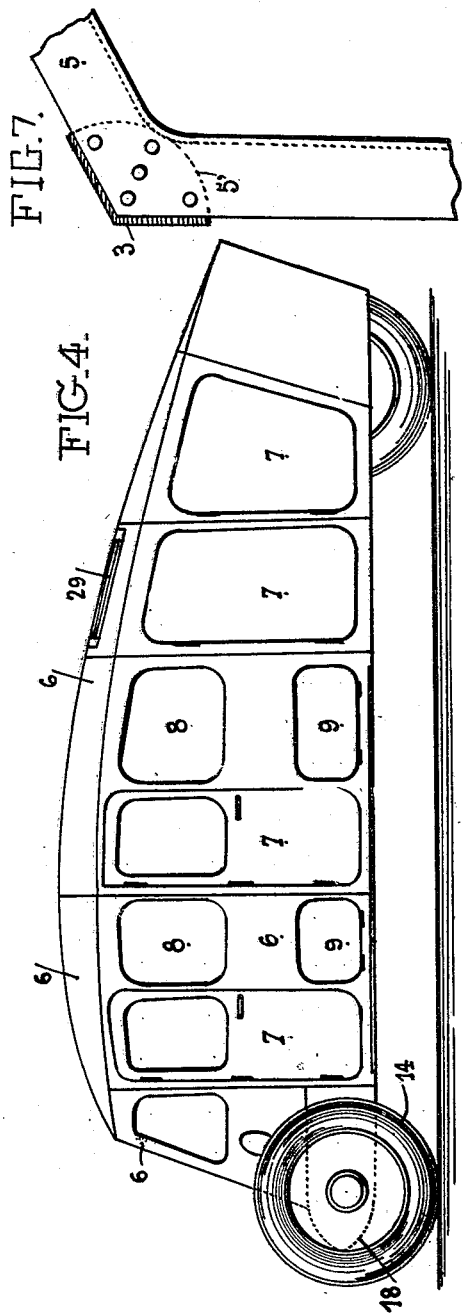
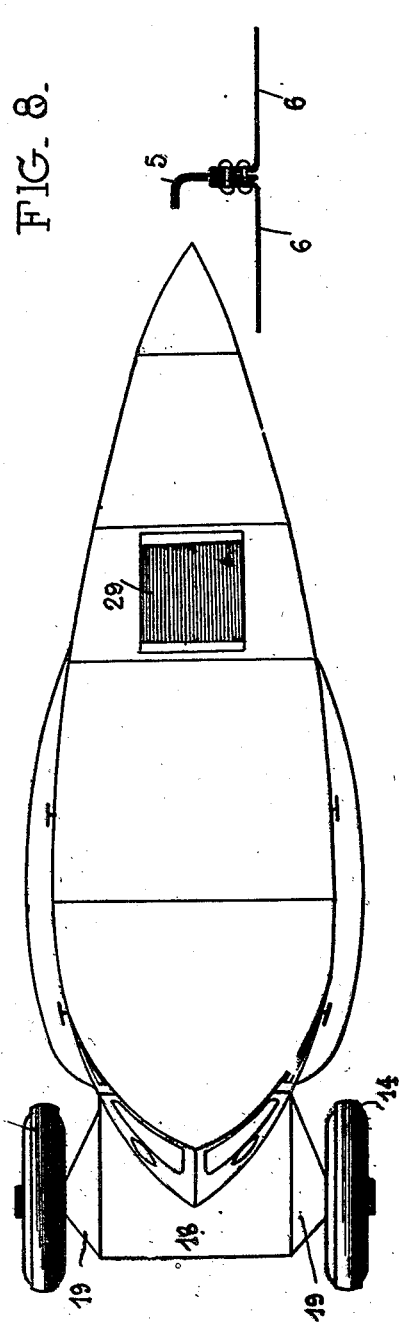

Patented June 19, 1928.

1,674,425

UNITED STATES PATENT OFFICE.

EMILE CLAVEAU, OF TOURS, FRANCE.

CONSTRUCTION OF CLOSED MOTOR VEHICLES.

Application filed January 24, 1924, Serial No. 688,174, and in France December 22, 1923.

Closed motor vehicles as at present constructed are formed of an ordinary chassis, usually deformable, upon which rigid coachwork is placed; such vehicles have the disadvantage of being very heavy, while the coachwork rapidly develops play and soon becomes noisy; moreover, its construction results in the vehicle offering a great resistance to forward movement, so requiring a high horse power to overcome the weight and resistance of the air. They are also costly.

According to this invention these defects are removed by a system of construction which has the following advantages:—

(1) Simplicity, lightness and economy of construction.

(2) Relatively small resistance to forward movement, owing both to the shape of the vehicle which takes into account aerodynamic laws utilized in aviation and aerostation apparatus, and to elimination of all parts and accessories outside the vehicle.

(3) Perfect accessibility of all parts.

(4) Protection of all parts against mud and dust.

(5) Reduction to a minimum of weight not suspended and better distribution of weight suspended which is arranged between the front and rear points of suspension and better bite on the road due to the lowering of the centre of gravity.

According to this invention a motor vehicle is formed of a homogeneous rigid framework formed of the combination of two longitudinal frames, an upper frame and a lower frame formed of shaped irons or sheet metal (preferably pressed sheet metal) connected together transversely by frames formed, for example, of pressed sheet metal or of shaped irons with panels formed of pressed sheet metal or other suitable material, fixed on the one hand to the transverse frames and on the other hand to the longitudinal frames, in such a manner as to form a general coating to the framework; these panels are provided with the openings necessary for the doors and doorways, for the windows and glazing and for the package boxes and others, preferably situated beneath the vehicle seats, for the lamps or head lights, etc.

The rigid framework thus formed, which is given a shape such as to offer minimum resistance to forward movement, may be mounted upon three or four wheels with the interposition of any suitable systems of suspension, which preferably ensures the absorption of shocks and the independence of the wheels to each other.

The rear wheel or wheels and the front wheel or wheels are advantageously enclosed inside the framework of the vehicle so as to offer no resistance to forward movement. If some of the wheels are situated outside the framework, they are provided with suitably shaped mud guards and so movable as to follow all movements of the wheel.

The invention is illustrated in the accompanying drawings in which:

Figs. 1 and 2 are elevation and plan views respectively of the forward portion of the vehicle framework and Figs. 1ª and 2ª are the corresponding views of the rearward portion of the vehicle framework.

Figs. 4 and 5 represent plan and elevational views respectively of the completed vehicle.

Fig. 7 is a detail view of the connection between the vertical and horizontal frames, and Fig. 8 illustrates the manner in which the body panels are attached to the body frame.

Figure 3:
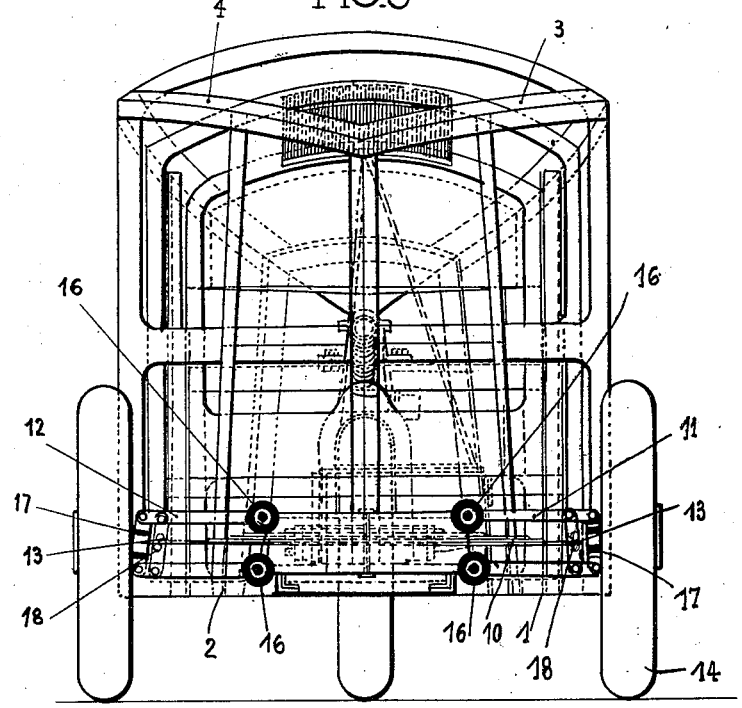
Fig. 3 is a front elevational view of the vehicle without the body panels and Fig. 6 is a similar view of the vehicle on a reduced scale with the body panels attached.

The framework of the vehicle is formed of four longitudinal bearers 1—2, 3—4, of steel angles or pressed sheet metal, the two ends of bearers 1—2 and 3—4 being respectively connected together. The two lower bearers 1 and 2 are formed of 90° steel angles, or 90° pressed sheet metal angles, while the two upper bearers 3—4 are formed of 120° steel angles or 120° sheet metal angles. The bearers are suitably curved to form two fish shaped longitudinal frames offering the least possible resistance to forward movement.

The two longitudinal bearers 1—2, 3—4, thus bent to frames are connected together transversely by five frames 5 of pressed sheet metal riveted or bolted, for example, upon corner plates 5' (Figure 7) secured to the bearers.

6 are sheet metal panels each formed in a single piece which are secured on the one hand to the frames 5 as illustrated in Figure 8, and on the other hand to the bearers 1—2, 3—4, either by rivets or bolts, and which connect together all the transverse frames.

The sheet metal panels are provided with holes for the doors or doorways 7, for the windows or glazings 8, and for receptacles 9 situated beneath the seats which may be formed to receive trunks of corresponding sizes, and it may be the headlights and lamps of the vehicle.

The doors or doorways 7 (doors leading to the vehicle seats and doors giving access to the engine or transmission members of the vehicle) and the receptacles 9 are also formed of pressed sheet metal.

The framework of the vehicle is supported in front and in rear (with a four wheel vehicle) by a transverse leaf spring 10 which ensures the independence of the movements of the wheels of a train of wheels.

The two ends of spring 10 are situated respectively between the two arms 11—11 and 12—12 of two movable parallelograms jointed both to the axle journals 13 of the wheels 14 and to the front crosshead 15 of the vehicle framework. Each pair of arms 11—11, 12—12, of the parallelogram forms in plan a triangle (see Figure 2); shock absorbing means 16 of any known type and carried by the crosshead may be provided at the joint of the triangles 11—11, 12—12. The ends of the leaf spring 10 can move freely between rollers 18, for example, carried by the joints 17 which near to the axle journals connect together the two arms of the parallelograms.

It will be seen that in this arrangement the arms of the parallelograms always remain parallel to each other during the displacements of the wheel and are independent of each other.

A casing 18' surrounds the crosshead 15 and the middle part of spring 10; flexible sleeves 19 of leather or rubber, for example, surround the parallelograms and connect casing 18' to the nave or to the front brake drum in order to prevent dust and mud from passing into the suspension, while allowing the wheels to move freely. Sleeves 19 are preferably of ovoid shape the large end forming a prolongation of casing 18' in order to offer minimum resistance to forward movement.

The front brakes are for the purpose of offering small resistance to forward movement, also masked in the corresponding wheels.

Figure 6:
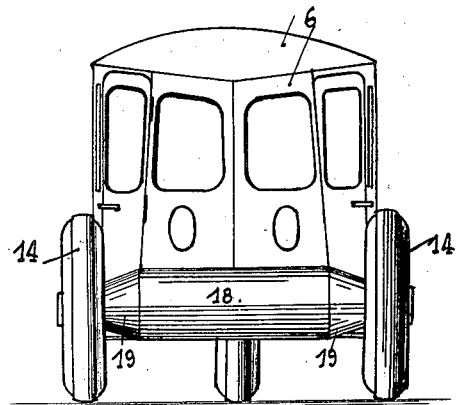

A three wheel vehicle (Figures 1 to 6) is mounted upon a rear wheel 14 situated within the framework of the vehicle and suspended by a fork 20 jointed at 21 (with the interposition of a frictional shock absorbing system) and whose tail slides in a fixed support 23 with the interposition of a suspension spring 24 for absorbing and braking shocks. Rear wheel 14 is interchangeable with the front wheels by the aid of a false hub secured by a pin.

With a four wheel vehicle the rear wheel suspension may be formed similarly to the front wheel suspension.

Of course the suspension arrangements above described are only given by way of example.

The wheels are preferably provided with flexible and movable mud guards (not shown) which are suitably shaped and are subjected to the same vertical and lateral displacement as the wheel itself with which they are fast.

The vehicle as illustrated is provided at 27 with an engine, and at 28 with a fuel tank and at 29 with a radiator.

As will be seen, in such vehicles no member forms an outward projection (with the exception of the front wheels) while the bottom of the vehicle enclosed by the panels is absolutely free and smooth.

What I claim is:—

In a motor vehicle, a fish shaped framework comprising upper and lower longitudinal frames, each of said frames converging adjacent the forward and rearward ends thereof and having portions secured together adjacent their forward ends, and cross frame members and vertical frame members connecting intermediate portions of said frames.

In testimony that I claim the foregoing as my invention I have signed my name this 7th day of January, 1924.

EMILE CLAVEAU.